United States Patent [19]

Morris et al.

[11] Patent Number: 4,781,296
[45] Date of Patent: Nov. 1, 1988

[54] METHOD AFFORDING AN EASY OPENING DEVICE FOR NONWOVEN THERMOPLASTIC FIBER ENVELOPES

[75] Inventors: Wayne K. Morris, Maplewood; Richard L. Sheehan, Jr., Grant Township, Washington County; Donald L. Pochardt, Cottage Grove, all of Minn.

[73] Assignee: Minnesota Mining and Manufacturing Company, St. Paul, Minn.

[21] Appl. No.: 53,613

[22] Filed: May 26, 1987

[51] Int. Cl.$^4$ .......................... B65D 33/20; B65D 3/26
[52] U.S. Cl. .................................. 206/610; 206/620; 206/634; 229/68 R
[58] Field of Search ............... 206/610, 632, 620, 634; 229/68 K, 76, 79–81

[56] References Cited

U.S. PATENT DOCUMENTS

| | | | |
|---|---|---|---|
| 3,179,327 | 4/1965 | Burton et al. | 206/610 |
| 3,426,959 | 2/1969 | Lemelson | 206/610 |
| 4,188,441 | 2/1980 | Cook | 428/216 |
| 4,367,312 | 1/1983 | Bontinck et al. | 525/93 |
| 4,521,467 | 6/1985 | Berger | 428/35 |
| 4,539,793 | 9/1985 | Malek | 206/632 |
| 4,580,683 | 4/1986 | Gochenour | 206/610 |

OTHER PUBLICATIONS

"Ultrasonic Bonding: A Practical View", Gary Flood, Nonwovens World, Nov. 1986.

Primary Examiner—Willis Little
Attorney, Agent, or Firm—Donald M. Sell; James A. Smith; Leland D. Schultz

[57] ABSTRACT

A method of forming one or more score lines or bands of weakness in a web formed of nonwoven thermoplastic fibers requires the application of sufficient energy such as ultrasonic energy to narrow bands of the web to change the fibers to a film. An envelope formed of tough nonwoven thermoplastic fibers for use in shipping documents may be formed with an easy open device by forming score lines in the envelope and the envelope and, if necessary, may be reinforced in the area of the score lines by a strip of oriented pressure-sensitive adhesive reinforcing tape applied over the bands and adjacent surfaces of the envelope on the interior side of the envelope and a tear tape may be applied to the pressure-sensitive adhesive tape in the area between the bands to afford means for tearing the envelope at the bands. Cuts are conveniently formed at the ends of the tape and bands to increase the ease of opening.

15 Claims, 2 Drawing Sheets

METHOD AFFORDING AN EASY OPENING DEVICE FOR NONWOVEN THERMOPLASTIC FIBER ENVELOPES

BACKGROUND OF THE INVENTION

1. Field of the Invention

This invention relates to a method for providing an easy opening device for envelopes, and in one aspect, to an opening device for use with bags formed of nonwoven tough thermoplastic fibers.

2. Description of the Prior Art

Mailing envelopes or shipping bags formed of a tough sheet material incorporating nonwoven thermoplastic fibers are commonly used by parcel carrier services. These envelopes are formed with a flap having a very aggressive pressure-sensitive adhesive disposed under a removable liner. After the bag is filled, the liner is removed from the pressure-sensitive adhesive (psa) and the flap is closed over the back panel of the envelope and seals the envelope flap securely. To remove the contents from the envelope it is often necessary to obtain a scissors to cut the bag along one edge.

Tear strips are placed on paper envelopes which permit one to grasp the end of the tear strip or tear tape and by pulling on the tear tape and holding the envelope a tear is placed in the area of the tear tape across the envelope. Because of the toughness of the fibers forming the envelopes used in the present invention, the application of a tear tape to the inner face of the envelope and pulling the same will not produce a tear in the web material forming the envelope.

It is therefore an object of the present invention to provide a method and apparatus for forming a tear opening structure on a bag or envelope formed of nonwoven thermoplastic fiber material such as polyolefin.

It is a further object of the present invention to provide a method of forming an easy open system on a nonwoven thermoplastic fiber formed envelope which will make the envelope as secure as the same is without the easy opening system but yet allow easy access to the envelope when desired.

It is a further object of the present invention to provide a process for making an easy open score line in a tough nonwoven polymeric fiber web.

It is a further object of the present invention to provide a novel envelope formed by the method of the present invention.

SUMMARY OF THE INVENTION

The present invention provides a method to form an envelope of a tough nonwoven thermoplastic fibrous material with an easy open tear line by forming a line along an edge of the bag or envelope where the nonwoven thermoplastic fibers have been reduced to the form of a film. The bag may be provided with two such lines where the fibers have been reduced to a film providing a strip which may be torn from the bag or envelope. To aid in tearing the strip from the bag or envelope a tear tape may be adhered between the lines formed by reducing the bag material to a film. To provide a bag with the toughness of the original bag material but with an easy open tape system, a strip of thermoplastic tape having a pressure-sensitive adhesive on one surface is adhered by the adhesive over the score lines where the fibers have been formed into a film and surrounding bag surface and further applying to the backing of said tape a tear tape having reinforcing filaments therein and a pressure-sensitive adhesive coating on one surface to adhere the same to the tape in a position between the score lines.

The process of the present invention for forming the easy opening system of the bag comprises the steps of applying sufficient energy in concentrated areas to form a score line in the nonwoven thermoplastic material where the fibers have been changed to a film. The step of applying the energy is performed by placing an ultrasonic horn against the web with the web in contact with a narrow metal rib. Subsequent steps comprise the application of a pressure-sensitive adhesive tape across the score line and the surrounding inside surface of the web forming the envelope. Then, a strip of tear tape, preferably reinforced, may be applied to the tape for tearing the tape and the web along the score line. A further step in the formation of the easy opening member for the tough fibrous bag is the formation of cuts at the ends of the tape and the ends of the score line or score lines on either side of the tear tape such that it may be readily grasped and pulled forming tears through the tape and in the areas where the envelope fibers are reduced to a film.

The web on which the score lines and the tape has been applied may then be folded conventionally to complete the formation of the envelope, or the score lines and tape may be applied to an exposed flap of an otherwise preformed bag or envelope.

BRIEF DESCRIPTION OF THE DRAWING

The invention will be further described with reference to the accompanying drawing wherein.

DETAILED DESCRIPTION

The present invention provides a method for manufacture of an easy opening device for use with bags or envelopes which are formed from tough nonwoven polyolefin material such as sold under the trademark "Tyvek" by the E. I. Du Pont de Nemours Company of Wilmington, Del. This nonwoven thermoplastic material is a nonwoven fibrous material formed of polyolefin fibers and sufficiently bonded to form a very tough web material which is highly resistant to tearing. Because of its extreme resistance it has heretofore not been provided with any tear tapes which would permit a tearing of the envelopes formed of such material along a seal or seam. The method of the present invention includes a step of forming a line of weakness along the web material by the application of sufficient energy in concentrated areas of the web to change the fibers forming the web material to film such that they lose their strength and form these lines of weakness, hereinafter referred to as score lines.

Figure 1:
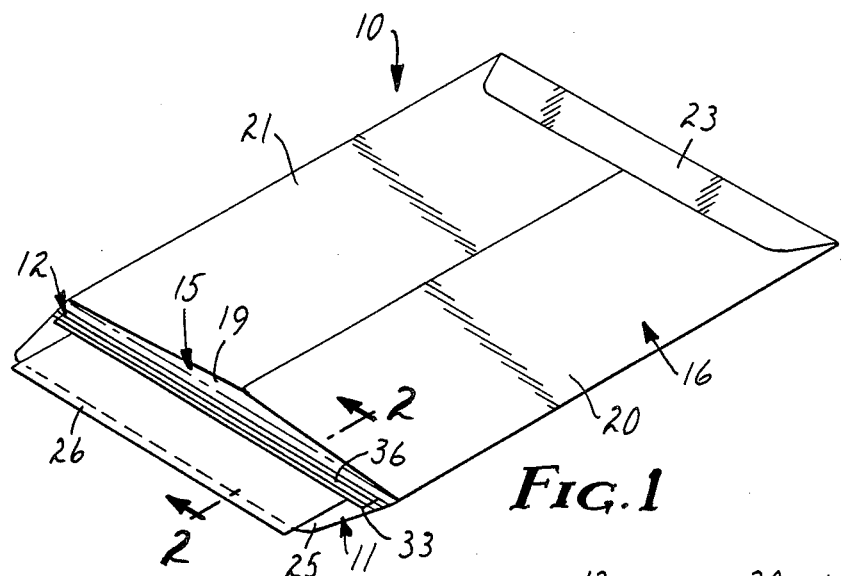
FIG. 1 is a perspective view of an envelope formed in accordance with the present invention.
Figure 2:
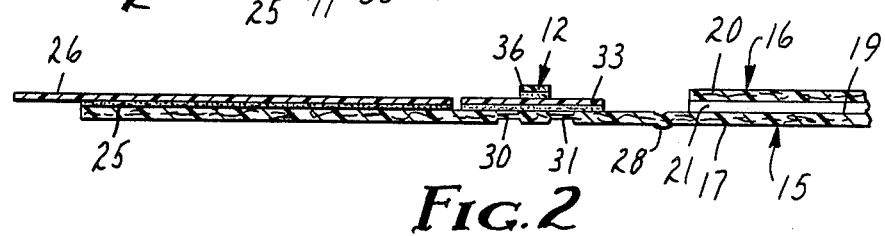
FIG. 2 is an enlarged detail cross sectional view taken along the line 2—2 of FIG. 1.
Figure 3:
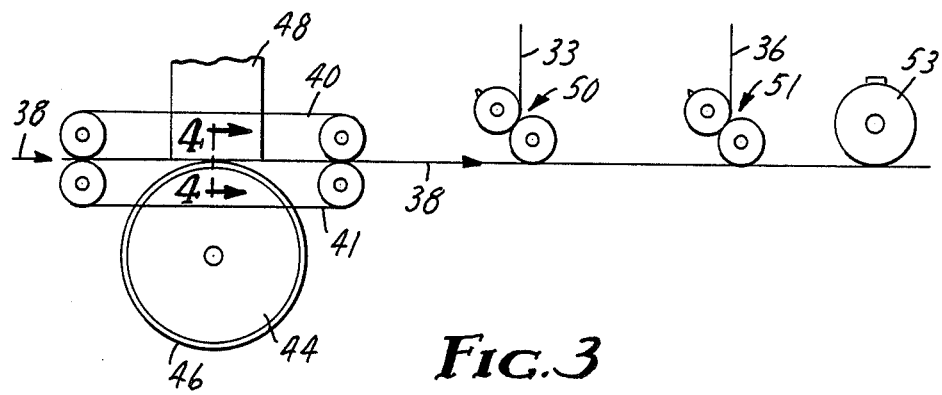
FIG. 3 is a schematic view of the steps used in forming the easy opening seal.

In FIG. 1 there is shown a conventional envelope 10 having a flap 11 to which is applied an easy opening device 12 constructed according to the present invention.

The envelope 10 is formed with a front panel 15 and a rear panel 16. The front panel 15 has a front face 17 and a rear face 19. The rear panel 16 is formed by overlapping flaps 20 and 21 which are joined by a glue or adhesive to form the back panel. A fourth flap 23 is formed, at the end opposite the flap 11 to fold over the flaps 20 and 21. Flap 23 is adhered to flaps 20 and 21 by a bead of glue or other adhesive to form the bottom of the envelope. The front panel 15 extends beyond the terminal edges of the flaps 20 and 21 opposite the flap 23 to form the closure flap 11. On the inside surface of the flap 11 is a coating of pressure-sensitive adhesive material 25 which is covered by a removable liner 26 which liner protects the adhesive until it is desired to seal the flap 11 over the opening to the envelope onto the rear panel 16.

Between the terminal end of the rear panel 16 and the adhesive coated area on the flap 11 is generally a fold line 28 permitting the flap to be folded over the rear panel 16. Between the fold line 28 and the adhesive coated surface of the flap 11 is the easy opening device 12.

The easy opening device 12 comprises a pair of parallel score lines 30 and 31 which extend across the width of the flap 11. Applied on the inside surface of the flap 11 and covering the score lines and surrounding portions of the flap 11 is a strip of pressure-sensitive adhesive reinforcing tape 33 comprising a backing of oriented polymeric material such as polypropylene. On one surface of the backing is applied a coating of a pressure-sensitive adhesive which will readily adhere to the web material of the envelope. Adhered to the generally central portion of the length of reinforcing tape 33 is tear tape means in the form of a narrow strip of tape 36 which extends the length of the reinforcing tape 33 and is positioned on the tape over the area of the web material between the score lines 30 and 31. The tear tape 36 is preferably a thin reinforced tape of about 0.125 inch (3.175 mm) in width, reinforced with glass or polymeric fibers to give it considerable tensile strength. Alternative tear tape means are tensilized polymeric films, polypropylene or polyvinyl chloride, with pressure-sensitive or heat activated adhesive, and an adhesive coated fiber yarn or filament, e.g. polyester.

Figure 4:
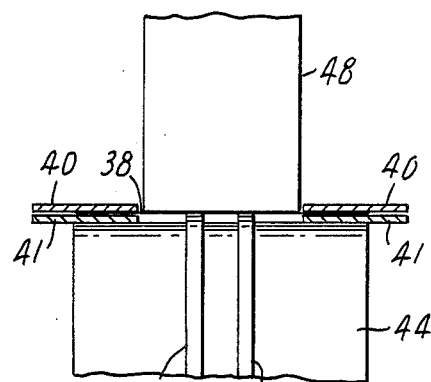
FIG. 4 is a detail sectional view of the apparatus for performing the method taken along the line 4—4 of FIG. 3.

In forming the easy opening device for the nonwoven web envelope, the web material 38 from which an envelope is formed or the flap 11 of a preformed envelope may be transported between opposed pairs of endless belts 40 and 41, with the belts 40 and 41 of each pair running in opposite directions but at the same speed to advance the web to and past a rotating anvil 44. A pair of raised ribs 45 and 46 as shown in FIG. 4 are formed on the anvil 44 to concentrate the energy along linear bands of the web material. Positioned opposite the rotating anvil 44 which has a tangential speed corresponding to the linear speed of the belts 40 and 41, is an ultrasonic horn 48 which provides sufficient energy in the form of a vibrational amplitude to the web in the presence of the pressure between the horn and the ribs 44 and 46 to transform the web in the areas of the ribs from a fibrous material to a film. The energy results in the fibers melting to form the film and thus lose their strength. The web material is still in a continuous form without any holes, but visible lines are formed where the material is in the form of a film and not a nonwoven web. After the web passes the horn and score lines such as 30 and 31 are formed in the web, the web moves past a tape applicating station 50 wherein a length of tape 33 comprising an oriented polymeric backing coated on one surface with a pressure sensitive adhesive is applied to the web or envelope. The tape 33 is applied to the inside surface of the web or envelope. At the next station 51 a length of the tear tape 36 also having a coating of pressure sensitive adhesive is applied to the surface of the tape 33. At the next station a cutting die 53 places a short slit in the web material 38 and the tape 33 at the ends of the tape 33 on each side of the tear tape 36.

Figure 5:
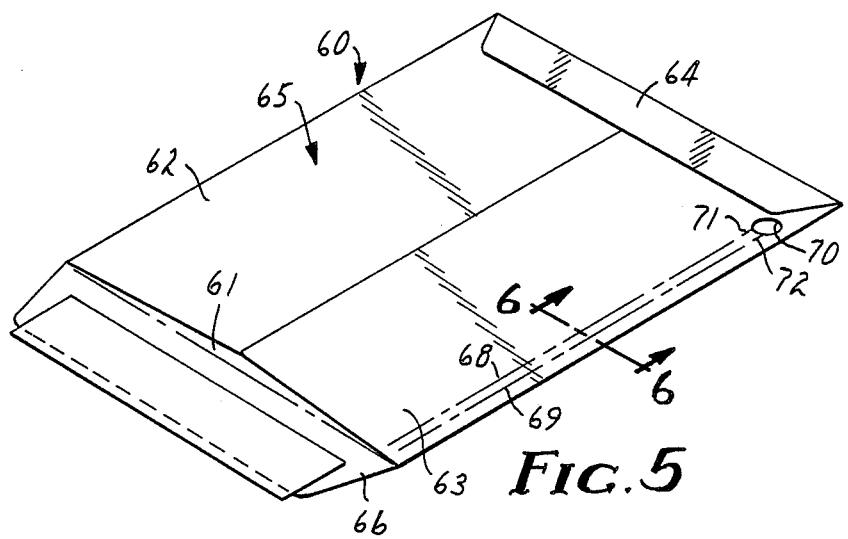
FIG. 5 is a perspective view of a second embodiment of the envelope wherein the easy opening device is formed in the web prior to the formation of the web into the envelope.
Figure 6:
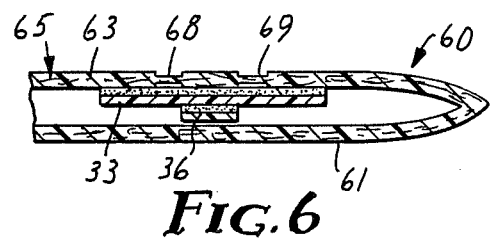
FIG. 6 is an enlarged sectional view taken on the line 6—6 of FIG. 5.

Referring now to FIG. 5 there is illustrated an envelope 60 formed from a web 38 similar to the envelope of FIG. 1 with a front panel 61 and three flaps 62, 63 and 64 which are folded to form a back panel 65 and a bottom. A fourth flap 66 can close over the envelope opening to seal the same. The flap 63 is formed from the section of web material 38 exposed to the ultrasonic vibrational energy, forming therein score lines 68 and 69. A hole 70 is formed in the envelope at one end of the score lines, and slits 71 and 72 are formed in the envelope, which slits communicate with the hole 70. As best illustrated in FIG. 6, a length of tape 33 is applied over the score lines 68 and 69 and the surrounding web material and a length of tear tape 36 is adhered to the tape 33 between the score lines 68 and 69.

After the envelope 60 is sealed in the usual manner it can be easily opened by grasping the end of the tear tape 36 between the slits 71 and 72 and pulling the tear tape 36 in a direction away from the back panel 65.

Examples of the process on equipment simulating a rotary dual line seal system as illustrated in the drawing follow. This simulation used a traversing plate with a stationary horn. A 6 inch (15.24 cm) radius horn was used to equate to the 12 inch (30.5 cm) diameter roll desired. Cams were used to allow positioning of the floating horn with respect to the anvil during each cycle of the scoring process. The anvil used two 0.050 inch (1.27 mm) wide welding ribs 45 and 46. The equipment was used at room temperature, e.g. approximately 72° F. (22.2° C.). The traversing plate was measured to reach a maximum of 137 fpm (69.6 cm/sec).

Excellent process tolerance was obtained on Tyvek ™ material from E. I. Du Pont de Nemours Company as follows:

Weld pressure tolerance [at 0.0047 inch (0.12 mm) peak to peak amplitude and 137 fpm (69.6 cm/sec)] was 130 to 210 pounds (59 to 95.25 kilograms) force [(75 to 120 psig (525 to 840 kPa) when using a 1.5 inch (3.8 cm) diameter air cylinder]. Higher pressure was not tried.

Amplitude tolerance [at 137 fpm (69.6 cm/sec) and 175 pounds (79.4 kilograms) force] was from 0.0037 inch (0.09 mm) peak to peak to 0.0053 inch (0.13 mm) [0.0053 inch (0.13 mm) was the upper limit of the system tested]. The same process tolerance was obtained at 60 fpm (30.5 cm/sec).

Speed tolerance [at 175 pounds (27.2 kg) force and 0.0047 inch (0.12 mm) peak to peak amplitude] was 40 fpm (20.32 cm/sec) to the machine maximum of 137 fpm (69. cm/sec).

Having thus described the invention with reference to a preferred method of forming the easy opening device and the easy open device for an envelope formed of a nonwoven tough polymeric fiber web material, it is to be appreciated that changes may be made without departing from the invention as claimed.

We claim:

1. A method of forming an area of weakness in a web of nonwoven thermoplastic fibers comprising the step of applying sufficient energy at an ultrasonic frequency in a concentrated area of said web to change the fibers forming the web to a film.

2. A method of forming a line of weakness in a web of nonwoven thermoplastic fibrous material comprising the steps of moving a length of a said web through a nip formed between an anvil and an ultrasonic horn and concentrating sufficient ultrasonic energy along a narrow band to impart sufficient heat along said band to said web to change said fibrous material to a film of tensile strength less than the fibrous material in the area of said band.

3. The method of forming a line of weakness according to claim 2 and including the step of laminating a pressure-sensitive adhesive reinforcing tape comprising an oriented polymeric backing to the web over said band of film and the areas adjacent thereto.

4. The method according to claim 3 including the step of laminating tear tape means to said polymeric backing of said pressure-sensitive adhesive reinforcing tape generally centrally and longitudinally of said backing for proprogating a tearing of the reinforcing tape.

5. The method according to claim 4 wherein said tear tape means comprises a tape comprising a narrow backing with reinforcing fibers and a pressure-sensitive adhesive coated on one surface.

6. The method according to claim 4 wherein said tear tape means comprises an adhesive coated tensilized polymeric tape.

7. The method according to claim 4 wherein said tear tape means comprises an adhesive coated member including one of fiber, yarn and filament.

8. A method of forming a tear strip easy opening device on an envelope formed of a tough web material comprising nonwoven thermoplastic fibers comprising the steps of advancing a portion of said web material through a nip between an anvil and an ultrasonic horn, one of said anvil and horn having a pair of narrow ribs engageable with said portion of said web material, applying sufficient energy to said web from said horn to convert said nonwoven fibers to a film in the area contacted by said ribs to form parallel score lines of weakness in said portion of web material, applying a length of reinforcing tape onto said portion of web material to cover said score lines of said web material and the surrounding web, and cutting slits in the tape and web material at an end of said tape and said score lines.

9. A method according to claim 8 wherein said method includes the further step of applying a narrow strip of tear tape material to said length of reinforcing tape and generally parallel to and between said score lines on the web material.

10. A method according to claim 8 wherein said step of advancing a portion of said web material through a nip between an anvil and an ultrasonic horn comprises advancing said web material past a rotatable anvil having parallel peripheral ribs contacting one surface of said web material.

11. A method according to claim 10 wherein said rotatable anvil is disposed opposite an ultrasonic horn and said web material is advanced therebetween.

12. An envelope formed of a tough web material of nonwoven thermoplastic fibers having a front panel and a back panel with the front panel extending from the bottom of the envelope a distance greater than the back panel to form a flap, and a pair of score lines formed in the envelope flap adjacent the envelope which score lines and the surrounding area of the envelope are covered by a length of reinforcing tape, which envelope flap and reinforcing tape have slits adjacent one end of the score lines.

13. An envelope according to claim 12 wherein tear tape means are adhered to one surface of said reinforcing tape lengthwise of said tape and generally centrally thereof.

14. An envelope according to claim 13 wherein said tear tape means comprises one of the group of reinforcing materials including a reinforced tape, tensilized tape, fiber, yarn and filament.

15. An envelope according to claim 12 wherein a tear tape comprising a reinforced backing having a pressure-sensitive adhesive adhered to one surface thereof is applied by said adhesive along said length of tape and is disposed between said score lines.

* * * * *